No. 725,250. PATENTED APR. 14, 1903.
L. L. HOFFMAN.
BRAKE FOR AUTOMOBILES.
APPLICATION FILED JAN. 3, 1903.
NO MODEL.
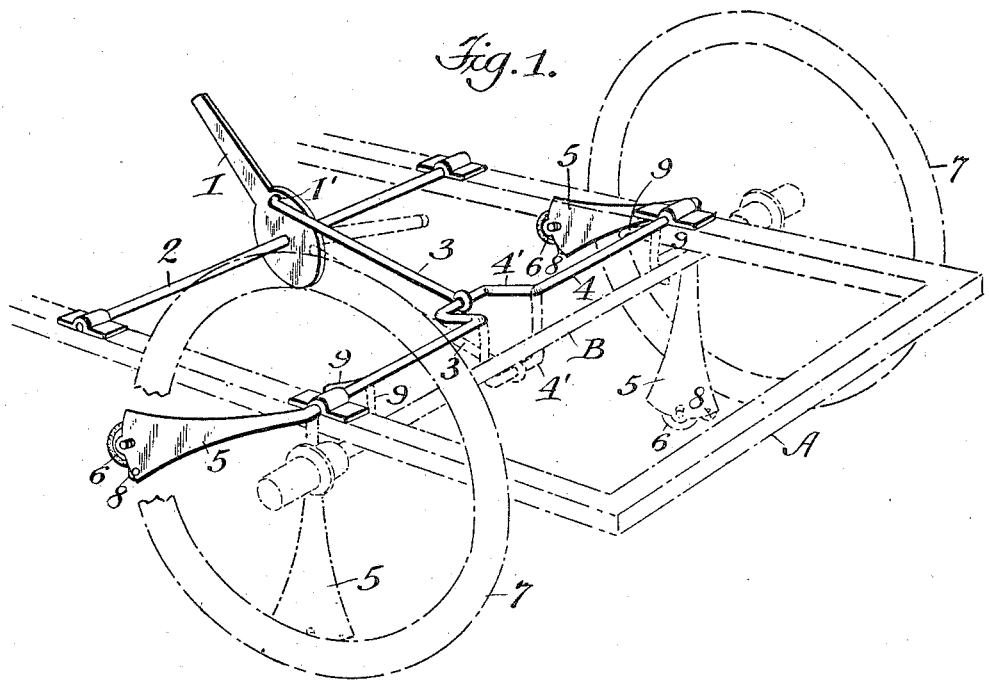
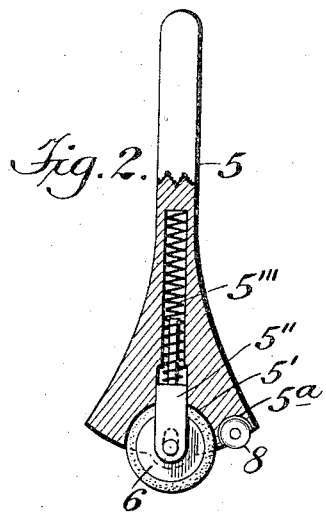
WITNESSES:
Ludwik L. Hoffman,
INVENTOR;
BY
his ATTORNEY.

UNITED STATES PATENT OFFICE.

LUDWIK L. HOFFMAN, OF NEW YORK, N. Y.

BRAKE FOR AUTOMOBILES.

SPECIFICATION forming part of Letters Patent No. 725,250, dated April 14, 1903.

Application filed January 3, 1903. Serial No. 137,632. (No model.)

*To all whom it may concern:*

Be it known that I, LUDWIK L. HOFFMAN, a subject of the Emperor of Russia, residing at New York, in the county and State of New York, have invented certain new and useful Improvements in Brakes for Automobiles, of which the following is a specification.

My invention pertains to brakes for vehicles, and is intended more especially for use on automobiles or other vehicles which may be driven at a rapid rate of speed, involving a corresponding degree of danger from obstacles lying in the road traveled and a corresponding necessity for the availability of means whereby such vehicles may be brought to a stop quickly and with certainty. By means of my improved brake this result may be effected by a simple movement of a lever operated by an occupant of a vehicle which is equipped with my improvement, and the operation may be performed with but little exertion on the part of said occupant.

In the drawings, Figure 1 is an elevation in perspective of a running-gear of a vehicle and of my improved brake, part of a wheel being broken away to show the brake and the latter being shown in full lines in its prime position and in dotted lines in an operative position. Fig. 2 is partly a vertical longitudinal section of a brake-arm and partly a side elevation of details.

Corresponding parts in both figures are denoted by the same reference characters.

Referring to the drawings, 1 designates a hand-lever which is fulcrumed on a bar 2, which is fixed transversely of the frame A of a running-gear. A link 3 is pivoted at one end at 1' on the lever 1 and at the other end to a crank 4' of a rock-shaft 4, which is mounted transversely of the frame A. Brake-arms 5 5, each of which has a recess 5' with parallel side walls in its free end, are fixed at each end, respectively, of the rock-shaft 4 and parallelly of the crank 4. The recesses 5' are semicircular in form longitudinally of the arms 5, and a rubber-tired wheel 6 of equal radial dimensions with the recesses 5' is suspended by means of a yoke 5'' and a helical spring 5''' within each brake-arm 5 and parallelly of the vehicle-wheels 7 7. A leading wheel 8 is rotatably mounted in a recess 5ª near the end of each brake-arm 5 and beneath each wheel 6 as the parts are shown in full lines in Fig. 1. Stop-arms 9 9 project from the brake-arms 5, respectively, and are engageable with the particular wheel-axle B on which rotate the particular wheels 7 which engage the brake, said engagement of the arms 9 with said axle being effectuated when the brake is operated.

The operation and advantages of my invention will be readily understood and appreciated by users thereof. It being assumed that the brake is applied to the rear wheels of a vehicle, as shown in the drawings, a movement of the lever 1 toward the rear of the vehicle causes the link 3 to rock the crank 4', rock-shaft 4, and brake-levers 5, thus contacting the leading wheels 8 with the surface of the ground and by means thereof drawing the wheels 6 also into contact with said surface and causing the weight of the vehicle to rest upon and be supported to a greater or less extent by the wheels 6, the periphery of which, by reason of its contact with the before-mentioned complementary surface in the recess 5', will oppose a frictional resistance to the rotation of the wheel 6 and also to the continued forward movement of the vehicle. The frictional resistance mentioned will necessarily be proportioned to the movement of the lever 1. Reversal of the movement of the lever 1 disengages the wheel 6 from the surface of the ground and renders the brake inoperative. The arms 9 by contacting the axle B limit the movements of the brake-arms 5.

I do not desire to be understood as limiting myself to the details of construction and arrangement as herein described and illustrated, as it is manifest that variations and modifications may be made in the features of construction and arrangement in the adaptation of the device to various conditions of use without departing from the spirit and scope of my invention and improvements. I therefore reserve the right to all such variation and modification as properly fall within the scope of my invention and the terms of the following claims.

Having thus described my invention, I claim and desire to secure by Letters Patent—

1. An automobile-brake, comprising, a hand-lever; a rock-shaft; a link connecting the hand-lever and said rock-shaft; brake-arms 5, 5, mounted on the rock-shaft; wheels respectively mounted in and peripherally frictionally engaging the several brake-arms 5, 5; and leading-wheels mounted in said brake-arms.

2. An automobile-brake, comprising, a hand-lever; a rock-shaft; a link connecting the hand-lever and said rock-shaft; brake-arms 5, 5, mounted on the rock-shaft; wheels respectively mounted in and peripherally frictionally engaging the several brake-arms 5, 5; leading-wheels mounted in said brake-arms; and stop-arms arranged to contact an axle of the vehicle.

In testimony whereof I have signed my name in the presence of the subscribing witnesses.

LUDWIK L. HOFFMAN.

Witnesses:
CHAS. H. DAVIDS,
J. C. PYBAS.